United States Patent
Yoneyama et al.

(10) Patent No.: US 10,090,921 B2
(45) Date of Patent: Oct. 2, 2018

(54) LIGHT MODULATION DEVICE AND LIGHT MODULATION METHOD

(71) Applicants: NIPPON TELEGRAPH AND TELEPHONE CORPORATION, Tokyo (JP); NTT Electronics Corporation, Yokohama-shi, Kanagawa (JP)

(72) Inventors: Mikio Yoneyama, Yokosuka (JP); Hiroto Kawakami, Yokosuka (JP); Takashi Ono, Yokosuka (JP); Akihiko Matsuura, Yokosuka (JP); Tomoyoshi Kataoka, Yokosuka (JP); Katsuya Tanaka, Yokohama (JP); Masahiro Tachibana, Yokohama (JP); Yuya Oyama, Yokohama (JP)

(73) Assignees: Nippon Telegraph And Telephone Corporation, Tokyo (JP); NTT Electronics Corporation, Yokohama-shi, Kanagawa (JP)

( * ) Notice: Subject to any disclaimer, the term of this patent is extended or adjusted under 35 U.S.C. 154(b) by 179 days.

(21) Appl. No.: 15/302,145

(22) PCT Filed: Apr. 10, 2015

(86) PCT No.: PCT/JP2015/061255
§ 371 (c)(1),
(2) Date: Oct. 5, 2016

(87) PCT Pub. No.: WO2015/156394
PCT Pub. Date: Oct. 15, 2015

(65) Prior Publication Data
US 2017/0117961 A1    Apr. 27, 2017

(30) Foreign Application Priority Data

Apr. 11, 2014 (JP) ................................. 2014-082274

(51) Int. Cl.
*H04B 10/12* (2006.01)
*H04B 10/04* (2006.01)
(Continued)

(52) U.S. Cl.
CPC ....... *H04B 10/07955* (2013.01); *H04B 10/00* (2013.01); *H04B 10/5161* (2013.01);
(Continued)

(58) Field of Classification Search
CPC .......... H04B 10/07955; H04B 10/5161; H04B 10/00; H04B 10/516; H04B 10/564;
(Continued)

(56) References Cited

U.S. PATENT DOCUMENTS 5,745,613 A * 4/1998 Fukuchi ............. H04B 10/2525
385/1
6,570,698 B2 * 5/2003 Kim ...................... G02F 1/0123
359/237

(Continued)

FOREIGN PATENT DOCUMENTS

| EP | 2148235 A1 | 1/2010 |
| JP | 2007-082094 A | 3/2007 |
| JP | 2012-217127 A | 11/2012 |

OTHER PUBLICATIONS

H. Kawakami et al., "Asymmetric dithering technique for bias conditioning monitoring in optical QPSK modulator", Electronics Letters, Mar. 18, 2010, vol. 46, No. 6, pp. 430-431.

(Continued)

*Primary Examiner* — Ken N Vanderpuye
*Assistant Examiner* — Abbas H Alagheband
(74) *Attorney, Agent, or Firm* — Harness, Dickey & Pierce, P.L.C.

(57) ABSTRACT

A light modulation device detects a power of the modulated optical signal modulated by each of an I-component optical modulator and a Q-component optical modulator, synchronously-detects a component of a frequency fd from the power of the modulated optical signal, outputs a dither signal of a frequency fd/n (where n is a positive integer equal (Continued)

to or larger than 1) applied to a first bias voltage or a second bias voltage when adjusting the first bias voltage or the second bias voltage, outputs two dither signals having a frequency fd/m (where m is a positive integer equal to or larger than 1, where n<m), which are mutually orthogonal to each other, applied to the first and second bias voltages when adjusting a third bias voltage, and adjusting bias voltages by increasing or decreasing bias voltages based on a synchronous detection result.

12 Claims, 6 Drawing Sheets

(51) Int. Cl.
  *H04B 10/00* (2013.01)
  *H04B 10/079* (2013.01)
  *H04B 10/516* (2013.01)
  *H04L 27/36* (2006.01)
  *H04J 14/08* (2006.01)
  *H04B 10/564* (2013.01)
  *G02F 1/01* (2006.01)

(52) U.S. Cl.
  CPC .............. *H04L 27/364* (2013.01); *G02F 1/01* (2013.01); *H04B 10/564* (2013.01); *H04J 14/08* (2013.01)

(58) Field of Classification Search
  CPC .......... H04L 27/364; G02F 1/01; H04J 14/00; H04J 14/08
  USPC ............................ 398/38, 192, 198, 183, 158
  See application file for complete search history.

(56) References Cited

U.S. PATENT DOCUMENTS

| | | | | |
|---|---|---|---|---|
| 7,734,194 B2* | 6/2010 | Yonenaga | .......... | H04B 10/5051 398/140 |
| 8,005,374 B2* | 8/2011 | Yonenaga | .......... | H04B 10/5051 398/140 |
| 8,041,228 B2* | 10/2011 | Charlet | ................. | G02F 1/0123 398/158 |
| 9,020,361 B2* | 4/2015 | Kawakami | ............ | G02F 1/0123 398/188 |
| 9,116,368 B2* | 8/2015 | Kawakami | ............ | G02F 1/0123 |
| 9,223,184 B2* | 12/2015 | Yamazaki | ............. | G02F 1/2255 |
| 9,264,144 B2* | 2/2016 | Yu | ............................ | H04L 27/18 |
| 9,312,961 B2* | 4/2016 | Le Taillandier De Gabory | | H04B 10/516 |
| 9,621,299 B2* | 4/2017 | Ishihara | ........... | H04B 10/25133 |
| 9,876,601 B2* | 1/2018 | Tanaka | ................. | H04B 10/564 |
| 2002/0171900 A1* | 11/2002 | Ono | .................... | H04B 10/505 398/183 |
| 2007/0065161 A1* | 3/2007 | Miura | ................... | G02F 1/0123 398/186 |
| 2010/0172653 A1* | 7/2010 | Yonenaga | .......... | H04B 10/5051 398/154 |
| 2012/0155865 A1* | 6/2012 | Kawakami | ............ | G02F 1/0123 398/43 |
| 2012/0288284 A1* | 11/2012 | Yoshida | ............. | H04B 10/5053 398/186 |
| 2014/0153077 A1* | 6/2014 | Kawakami | ............ | G02F 1/0123 359/259 |
| 2014/0233963 A1* | 8/2014 | Le Taillandier De Gabory | | H04B 10/541 398/183 |
| 2015/0222365 A1* | 8/2015 | Goebuchi | ............. | G02F 1/0123 398/188 |
| 2015/0341138 A1* | 11/2015 | Ishihara | ........... | H04B 10/25133 398/35 |
| 2016/0285548 A1* | 9/2016 | Nishihara | .............. | H04B 10/50 |

OTHER PUBLICATIONS

Hiroto Kawakami et al., "Auto Bias Control Technique Based on Asymmetric Bias Dithering for Optical QPSK Modulation", Journal of Lightwave Technology, Apr. 1, 2012, vol. 30, No. 7, pp. 962-968.
International Search Report for PCT/JP2015/061255, dated Jun. 30, 2015.
Extended European Search Report for parallel application EP 15776434.1, EPO, Munich, dated Oct. 2, 2017.

* cited by examiner

LIGHT MODULATION DEVICE AND LIGHT MODULATION METHOD

CROSS-REFERENCE TO RELATED APPLICATIONS

This application is a National Stage of International Application No. PCT/JP2015/061255 filed Apr. 10, 2015, claiming benefit to Japanese Patent Application No. 2014-082274 filed Apr. 11, 2014. The entire disclosures of each of the above applications are incorporated herein by reference.

TECHNICAL FIELD

The present invention relates to a light modulation device and a light modulation method.

BACKGROUND ART

As transmission coding for use in optical transmission systems, quadrature amplitude modulation (hereinafter, referred to as QAM (Quadrature Amplitude Modulation)) signals, which can transmit a large amount of optical signals at low symbol rates, have attracted a lot of attention. The simplest QAM method is 4-value QAM, which is called QPSK (Quadrature Phase Shift Keying). The present invention can be applied to any types of multivalued QAM modulators including QPSK. For the sake of simplicity, the present specification solely refers to 16-value QAM methods. The 16-value QAM method is realized using two 4-value drive signals while other multivalued QAM signals are realized by changing multiple values of drive signals in embodiments.

FIG. 5 is a block diagram showing the configuration of a light modulation device 500$p$. A continuous-wave optical signal (hereinafter, referred to as a CW (Continuous Wave) optical signal) to be modulated is input to an IQ optical modulator 100, branched into two signals by an optical coupler 1, and then input to optical modulators 2 and 3. Normally, the optical modulators 2 and 3 are optical modulators of a MZI (Mach-Zehnder Interferometer) type. The optical modulator 2 has a function of relatively changing optical waveguides 22 and 23 in optical phase and optical intensity in correspondence with a logic of a first 4-value data signal, generated by a drive amplifier 6, Data1, ⁻Data1, thus causing a phase shift of $-f_1$ in the example of FIG. 5. The optical modulator 3 has a function of relatively changing optical waveguides 32 and 33 in optical phase and optical intensity in correspondence with a logic of a second 4-value signal, generated by a drive amplifier 7, Data2, ⁻Data2, thus causing a phase shift of $-f_2$ in the example of FIG. 5. In characters shown FIG. 5, for example, a reference sign such as "Data1" with an upper bar (⁻) indicates a logical negation of "Data1". In the present specification, for example, the logical-negated sign is denoted as "⁻Data1", i.e. a bar (⁻) followed by characters.

Additionally, bias power supplies 8$p$ and 9$p$ apply direct-current, i.e. DC (Direct Current), voltages $-V_{bias1}$ and $-V_{bias2}$ to the optical modulators 2 and 3 through electrodes 81$a$, 81$b$ and electrodes 91$a$, 91$b$ respectively. Applying the DC voltages $-V_{bias1}$ and $-V_{bias2}$ applies phase shifts of $-q_1$ and $-q_2$ to the CW optical signal applied to the optical waveguides 22, 23 and the optical waveguides 32, 33 respectively. The DC voltages $-V_{bias1}$ and $-V_{bias2}$ refer to as data bias voltages, wherein the values of $-V_{bias1}$ and $-V_{bias2}$ are set to the null points of the optical modulators 2 and 3. That is, the data bias voltage $-V_{bias1}$ is set to turn off the output light of the optical modulator 2 when a differential voltage between signals generated by a drive amplifier 6 is zero, while the data bias voltage $-V_{bias2}$ is set to turn off the output light of the optical modulator 3 when a differential voltage between signals generated by a driver amplifier 7 is zero.

An optical phase shifter 4 applies a phase shift of $q_3$ to the output signal of the optical modulator 3, which is then multiplexed (or connected) with the output signal of the optical modulator 2 by an optical coupler 5, thus outputting a 16-value optical QAM signal.

Herein, when $q_3$ is $-p/2$, it is possible to obtain the best waveform. Herein, $-p/2$ corresponds to a quarter of a carrier waveform. In general, the carrier waveform is measured in a micrometer order; hence, it is very severe for the optical phase shifter 4 to carry out phase adjustment. Since the quality of light of an optical QAM signal is sensitive to an error of the optical phase shifter 4, it is crucially important to adjust a phase variation of the optical phase shifter 4 to a correct value. Generally speaking, this adjustment is implemented by adjusting a bias voltage (hereinafter, referred to as an quadrature bias voltage) $V_{bias3}$ which is supplied to the optical phase shifter 4 from a bias voltage supply 10$p$.

Herein, a differential signal (Data1-⁻Data1) generated by the drive amplifier 6 represents four types of signal levels $V_0$, $V_1$, $-V_1$, $-V_0$ where $V_0 > V_1 > -V_1 > -V_0$. In general, the optical modulators 2 and 3 are identical to each other in terms of optical characteristics; hence, a differential signal (Data2-⁻Data2) generated by the drive amplifier 7 represents four types of signal levels $V_0$, $V_1$, $-V_1$, $-V_0$. Additionally, the maximum amplitude for the differential outputs of the drive amplifiers 6 and 7 are set in advance not to exceed a half-wavelength voltage $V_p$ of the optical modulators 2 and 3. This concludes $2V_p \ddagger V_0 - (-V_0) = 2V_0$.

The above half-wavelength voltage $V_p$ will be described below. As described above, the optical modulator 2 is of a MZI-type modulator incorporating two optical waveguides 22 and 23. It is assumed that the data bias voltage Vbias1 is adjusted to turn off the output light of the optical modulator 2 when both the voltages Data1 and ⁻Data1 applied to the two optical waveguides 22 and 23 are zero. Normally, complementary drive signals are applied to two optical modulators 22 and 23. For example, $2V_x$ will be referred to as the half-wavelength voltage $V_p$ when the optical output of the optical modulator 2 reaches the maximum intensity at Data1=$V_x$ and ⁻Data1=$-V_x$. The optical output of the optical modulator 2 reaches the maximum intensity at Data1=$-V_x$ and ⁻Data1=$V_x$ as well. In this case, the optical output may differ in optical phase by p in comparison with the case of Data1=$V_x$ and ⁻Data1=$-V_x$. Since the optical modulator 2 changes an optical phase using this property, the optical modulator 2 is designed such that each of the voltages Data1 and ⁻Data1 has a maximal amplitude of $V_p$, and therefore (Data1-⁻Data1) has a maximum amplitude of $2V_p$. The optical modulator 3 has the same configuration as the optical modulator 2.

FIG. 6 is a graph showing the characteristics of the light modulation device 500$p$ being appropriately biased, thus diagrammatically showing the relationship between an electric field $E_1$ of an optical signal output from the optical modulator 2 and $V_0$, $V_1$, $-V_1$, $-V_0$, and $V_{bias1}$. Herein, it is possible to draw a sine wave when the vertical axis represents the sum of the potentials of drive signals $V_0$, $V_1$, $-V_1$, $-V_0$ and the data bias voltage $V_{bias1}$ while the horizontal axis represents the electric field $E_1$ of an optical signal output from an optical waveguide 104. For the sake of simplicity in description, this graph omits all the non-essential coefficients. With an appropriate value of the data bias voltage, $V_0, V_1, -V_1, -V_0$ should be plotted to be symmetrical to the null point while electric fields $E_{11}, E_{12}, E_{13}, E_{14}$ corresponding to optical signals generated based on $V_0, V_1, -V_1, -V_0$ should be plotted to be symmetrical to the zero level. The relationship between an electric field $E_2$, corresponding to an optical signal output from the optical modulator 3, and $V_0, V_1, -V_1, -V_0$, and Vbias2 will be similar to the relationship of FIG. 6.

FIG. 7 is a graph showing the constellation with appropriate biases. Herein, $q_3 = p/2$ when an appropriate value of the quadrature bias voltage $V_{bias3}$ is applied to the optical phase shifter 4. FIG. 7 shows a grid-like constellation corresponding to an optical signal output from an IQ optical modulator 100 since the optical signals output from the optical modulators 2 and 3 are orthogonal to each other in terms of optical phases. It is crucial that the constellation includes symbols which are plotted to be symmetrical to the origin. The symmetry is a common property for any QAM other than 16-value QAM. In this connection, $E_1$ and $E_2$ are orthogonal to each other as long as $q_3 = p/2$ is maintained; hence, $E_1$ will be referred to as an In-Phase component (or a common-mode component) while $E_2$ will be referred to as a Quadrature-Phase component (or a quadrature component), wherein those components will be simply referred to as an I component and a Q component.

An optical power $P_{total}$ of a 16-value QAM signal is proportional to the square sum of electric fields at various symbols in the constellation. Herein, $P_{total}$ is given by Equation (1). In Equation (1), S means the sum of values while changing K and L from one to four.

[Equation 1]

$$P_{total} \propto \Sigma(|E_{1K}|^2 + |E_{2L}|^2) \quad (1)$$

It is known that appropriate values for three bias voltages $V_{bias1}, V_{bias2}, V_{bias3}$ will be changed in a lapse of time or along with temperature variations; hence, this phenomenon will be referred to as bias drift. Non-Patent Literature Document 1 shows that the total of optical power $P_{total}$ will not be changed as long as $V_{bias}1$ and $V_{bias2}$ are retained at appropriate values although any bias drift occurring on $V_{bias3}$ causes q3 to take a different value than p/2. For this reason, it is difficult to detect any drift of $V_{bias3}$.

In contrast, it is possible to detect any drift of $V_{bias3}$ by dithering $V_{bias1}$ and $V_{bias2}$ according to the asymmetrical bias dithering technique disclosed in Non-Patent Literature Document 1. The asymmetrical bias dithering applies low-speed dithering to $V_{bias1}$ and $V_{bias2}$. Herein, dither signals applied to $V_{bias1}$ and $V_{bias2}$ have the same frequency, but they are shifted in phase by 90. It is assumed that a dither signal applied to $V_{bias1}$ is $\cos(w_d \cdot t)$ while a dither signal applied to $V_{bias2}$ is $\sin(w_d \cdot t)$. Herein, $w_d$ is an angular vibration frequency (or an angular frequency) while t is a variable of time.

With any drift occurring on any one of bias voltages, an intensity modulation component corresponding to a frequency $f_d (=w_d/2p)$ of a dither signal occurs in the intensity of an optical output of the IQ optical modulator 100. Non-Patent Literature Document 1 discloses that, due to any drift of $V_{bias1}$, the intensity modulation component superposed on an optical output of the IQ optical modulator 100 will be synchronized with $-\sin(w_d \cdot t)$. In contrast, due to any drift of $V_{bias2}$, the intensity modulation component superposed on an optical output of the IQ optical modulator 100 will be synchronized with $-\sin(2w_d \cdot t)$. Herein, positive/negative signs correspond to positive/negative drift values applied to each bias.

Using this property, it is possible to compensate for any drift of each bias while correcting a bias voltage to an appropriate value. That is, synchronous detection is carried out using angular frequency of $w_d$ or $2w_d$ on the optical output of a modulator so as to apply feedbacks to the bias voltages Vbias1, Vbias2, Vbias3 such that the synchronous detection result will become zero, it is possible to maintain each bias voltage at an appropriate value irrespective of any bias drift. In this connection, it is possible to synchronously-detect odd-degree high frequency components which may occur in addition to a single intensity modulation superposed on the modulated light when a dithering signal does not have a sine wave but a square wave.

CITATION LIST

Non-Patent Literature Document

Non-Patent Literature Document 1: H. Kawakami, E. Yoshida and Y. Miyamoto, "Asymmetric dithering technique for bias condition monitoring in optical QPSk modulator", Electronics Letters 18th (March 2010), vol. 46, no. 6, pp. 430-431.

SUMMARY OF INVENTION

Technical Problem

However, the configuration disclosed in Non-Patent Literature Document 1 requires a synchronous detection circuit adapted to multiple frequencies. It is possible to realize synchronous detection synchronized with $\cos(w_d \cdot t)$ and synchronous detection synchronized with $\sin(w_d \cdot t)$ with the same synchronous detection circuit although it is necessary to change the phase of a reference clock signal by 90. In order to additionally realize synchronous detection synchronized with $\sin(2w_d \cdot t)$, however, it is necessary to arbitrarily change the center frequency of a band-pass filter (BPF) inside the synchronous detection circuit, or it is necessary to prepare another set of the synchronous detection circuit having a different center frequency of BPF. This causes a problem that devices need complex configurations or large scales of circuitry.

The present invention is made to solve the above problem; hence, the present invention aims to provide a light modulation device and a light modulation method which can carry out synchronous detection at the same frequency when detecting any drift in bias voltages due to optical modulation of QAM signals.

Solution to Problem

To solve the above problem, one aspect of the present invention is a light modulation device configured to carry out a quadrature amplitude modulation on a continuous-wave optical signal. The light modulation device includes an I-component optical modulator configured to modulate one of continuous-wave optical signals being branched from the continuous-wave optical signal; a Q-component optical modulator configured to modulate the other of continuous-wave optical signals being branched from the continuous-wave optical signal; an optical phase shifter configured to apply a phase shift to one of or both of an output signal of the I-component optical modulator and an output signal of the Q-component optical modulator; a first bias voltage output part configured to output a first bias voltage being set to a null point when no drive signal is applied to the I-component optical modulator; a second bias voltage output part configured to output a second bias voltage being set to the null point when no drive signal is applied to the Q-component optical modulator; a third bias voltage output part configured to output a third bias voltage used to adjust the phase shift caused by the optical phase shifter; an optical power monitor configured to detect the power of a modulated optical signal modulated by each of the I-component optical modulator and the Q-component optical modulator; a synchronous detection circuit configured to synchronously-detect a component of a frequency $f_d$ from the power of a modulated optical signal; and a control circuit configured to output a dither signal of a frequency $f_d/n$ (where n is a positive integer equal to or larger than 1) applied to the first bias voltage or the second bias voltage when adjusting the first bias voltage or the second bias voltage while outputting two dither signals having a frequency $f_d/m$ (where m is a positive integer equal to or larger than 1, where n<m), which are mutually orthogonal to each other, applied to the first bias voltage and the second bias voltage when adjusting the third bias voltage, thus adjusting the bias voltages by increasing or decreasing the bias voltages based on the synchronous detection result.

According to one aspect of the present invention concerning the light modulation device described above, the control circuit outputs a cosine signal of the frequency $f_d/n$ as the dither signal when adjusting the first bias voltage, outputs a sine signal of the frequency $f_d/n$ as the dither signal when adjusting the second bias signal, and outputs a cosine signal of the frequency $f_d/m$ as the dither signal for the first bias voltage while outputting a sine signal of the frequency $f_d/m$ as the dither signal for the second bias voltage when adjusting the third bias voltage. The synchronous detection circuit carries out synchronous detection using the cosine signal of $f_d/n$ as a reference clock signal when adjusting the first, second, and third bias voltages, while the synchronous detection circuit carries out synchronous detection using the sine signal of the frequency $f_d/n$ as a reference clock signal when adjusting the second and third bias voltages.

According to one aspect of the present invention concerning the light modulation device described above, n equal to 1 while m equals to 2.

According to one aspect of the present invention concerning the light modulation device described above, the control circuit determines an order of a period of adjusting the first bias voltage, a period of adjusting the second bias voltage, and a period of adjusting the third bias voltage in advance. The control circuit repeats sequentially outputting the dither signals for their periods and its corresponding reference clock signal to the synchronous detection circuit.

According to one aspect of the present invention concerning the light modulation device described above, the first bias voltage output part increases or decreases the first bias voltage according to a control signal supplied thereto; the second bias output part increases or decreases the second bias voltage according to a control signal supplied thereto; and the third bias output part increases or decreases the third bias voltage according to a control signal supplied thereto. The light modulation device further increases a first dither signal applying part, connected to the first bias voltage output part and the control circuit, configured to apply the dither signal output from the control circuit to the first bias voltage, and a second dither signal applying part, connected to the second bias voltage output part and the control circuit, configured to apply the dither signal output from the control circuit to the second bias voltage. The control circuit repeats sequentially outputting the control signal, including information as to whether or not an appropriate bias is obtained from the synchronous detection result, to each of the first, second, and third bias voltage output parts corresponding to their periods, sequentially outputting the dither signals corresponding to their periods to the first and second dither signal applying parts while outputting the reference clock signal corresponding to each period to the synchronous detection circuit.

According to one aspect of the present invention concerning the light modulation device described above, the I-component optical modulator, the Q-component optical modulator, the optical phase shifter, and the optical power monitor are mounted on the same optical integrated circuit.

According to one aspect of the present invention concerning the light modulation device described above, the control circuit and the synchronous detection circuit are formed using a digital circuit, thus causing the digital circuit to implement a means for outputting the dither signal of the frequency $f_d/n$ (where n is a positive integer equal to or larger than 1) applied to the first bias voltage or the second bias voltage when adjusting the first bias voltage or the second bias voltage, a means for outputting two dither signals having the frequency $f_d/m$ (where m is a positive integer equal to or larger than 1, where n<m), which are mutually orthogonal to each other, applied to the first and second bias voltages, a means for synchronously-detecting the component of the frequency $f_d$ from the power of the modulated optical signal, and a means for adjusting bias voltages by increasing or decreasing bias voltages based on the synchronous detection result.

According to one aspect of the present invention, a light modulation method is adapted to a light modulation device including an I-component optical modulator configured to modulate one of continuous-wave optical signals, branched from a continuous-wave optical signal, a Q-component optical modulator configured to modulate the other of continuous-wave optical signals, branched from the continuous-wave optical signal, and an optical phase shifter configured to apply a phase shift to each of or both of an output signal of the I-component optical modulator and an output signal of the Q-component optical modulator. The light modulation method includes the steps of: outputting a first bias voltage being set to a null point when no drive signal is applied to the I-component optical modulator; outputting a second bias voltage being set to the null point when no drive signal is applied to the Q-component optical modulator; outputting a third bias voltage used to adjust the phase shift caused by the optical phase shifter; detecting the power of a modulated optical signal modulated by each of the I-component optical modulator and the Q-component optical modulator; synchronously-detecting a component of a frequency $f_d$ from the power of the modulated optical signal; outputting a dither signal of a frequency $f_d/n$ (where n is a positive integer equal to or larger than 1) applied to the first bias voltage or the second bias voltage when adjusting the first bias voltage or the second bias voltage; outputting two dither signals having a frequency $f_d/m$ (where m is a positive integer equal to or larger than 1, where n<m), which are mutually orthogonal to each other, applied to the first bias voltage and the second bias voltage when adjusting the third bias voltage; and adjusting bias voltages by increasing or decreasing bias voltages based on the synchronous detection result.

Advantageous Effects of Invention

According to the present invention, it is possible to realize a configuration of carrying out synchronous detection on dither signal components, superposed on optical QAM signals, by detecting any drift occurring in multiple bias voltages by way of synchronous detection solely using a single frequency $f_d$.

DESCRIPTION OF EMBODIMENTS

First Embodiment

Hereinafter, the embodiments of the present invention will be described with reference to the drawings.

Figure 1:
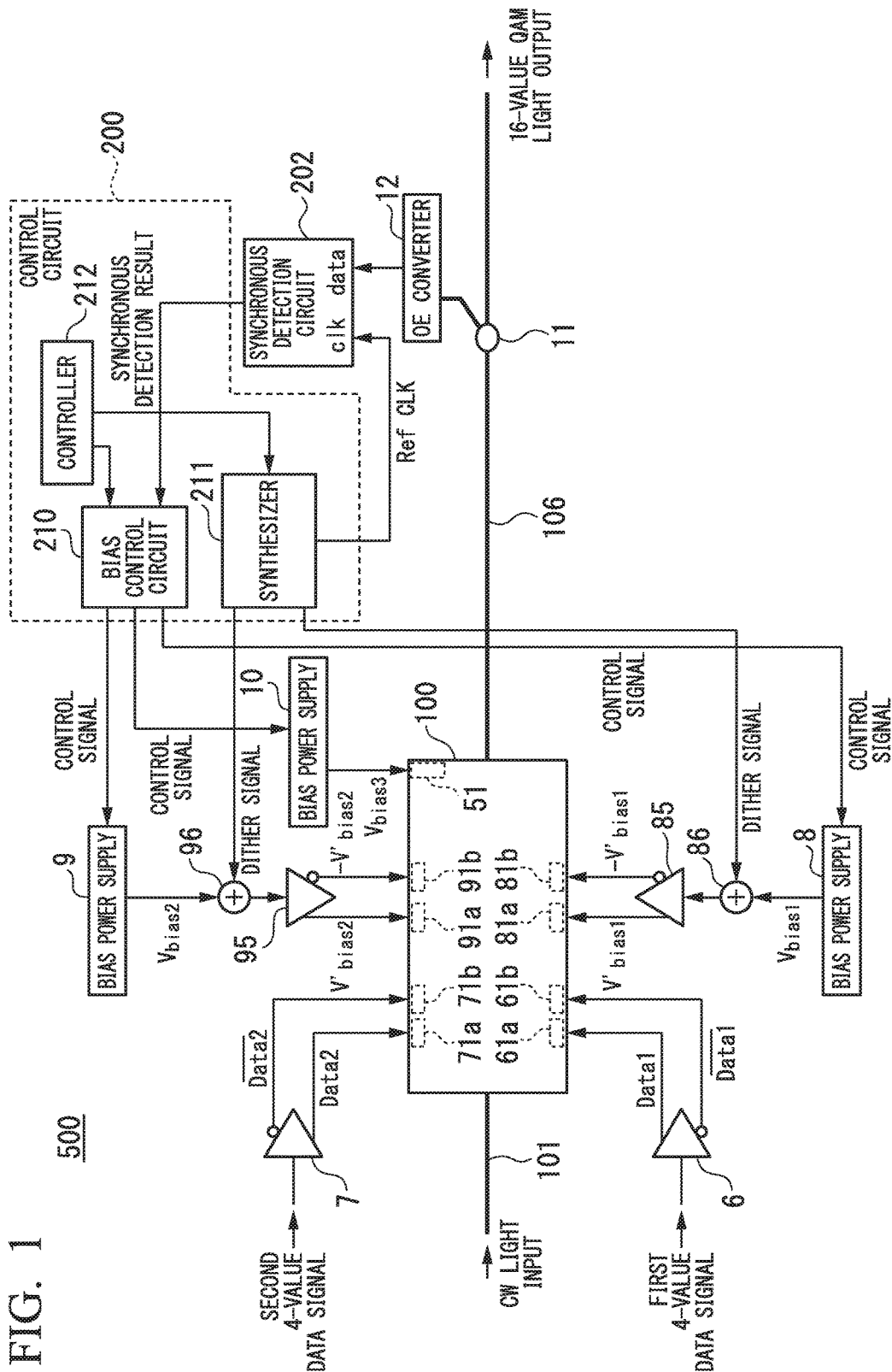
FIG. 1 is a block diagram showing the configuration of a light modulation device according to a first embodiment of the present invention.

FIG. 1 is a block diagram showing the diagrammatic configuration of a light modulation device 500 according to the first embodiment of the present invention. The following description refers to a light modulation device configured to output 16-value QAM signals, but it is possible to modify the light modulation device to generate different multivalued QAM signals by changing values of drive signals to multiple values other than four values.

Figure 2:
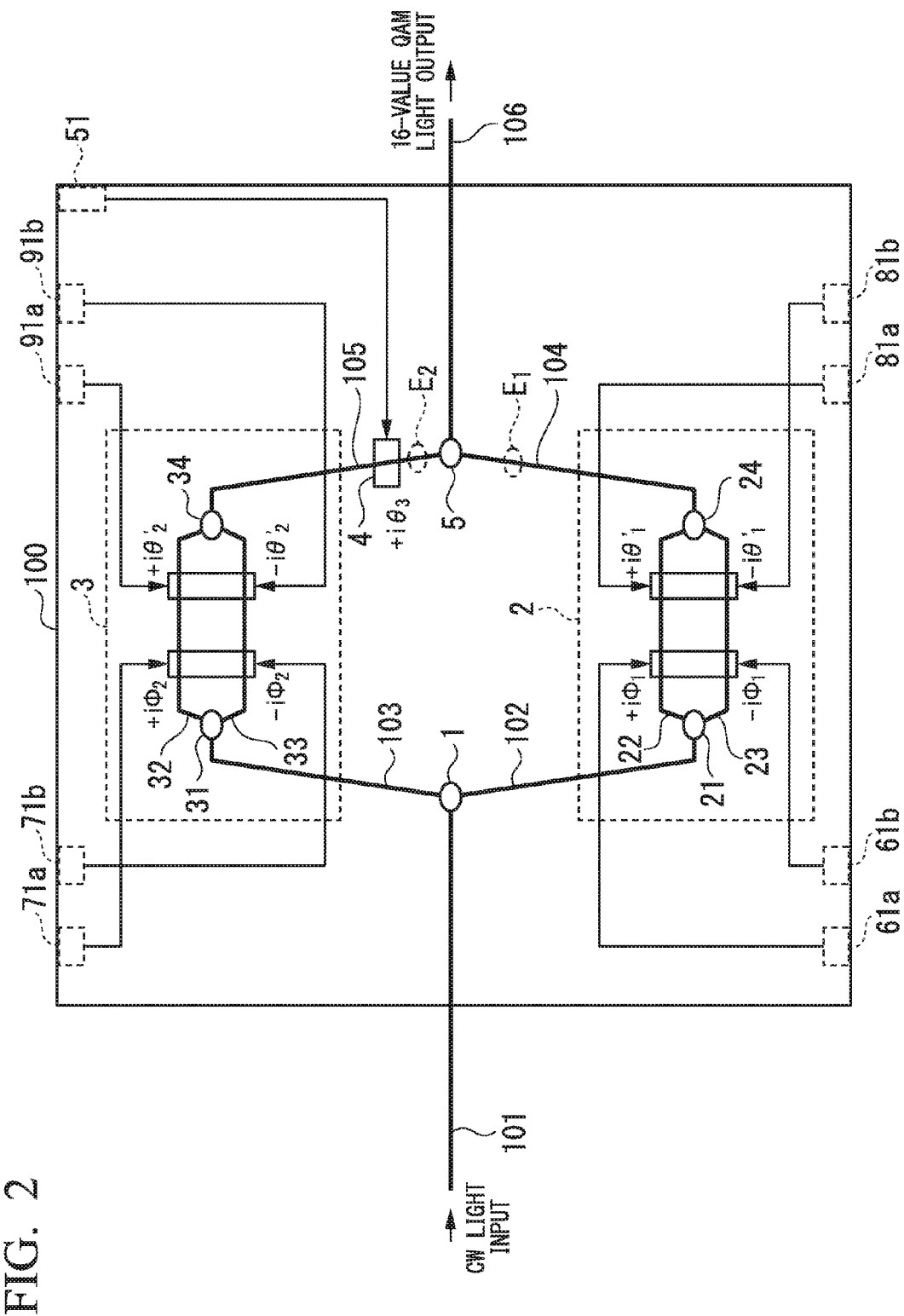
FIG. 2 is a block diagram showing the configuration of an IQ optical modulator in the first embodiment.

In the light modulation device 500, the IQ optical modulator 100 has the internal configuration as shown in FIG. 2, which includes an input optical waveguide 101, an optical coupler 1, an optical modulator 2, an optical modulator 3, optical waveguides 104, 105, an optical coupler 5, and an optical phase shifter 4. A CW optical signal is supplied the input optical waveguide 101. The optical coupler 1 coupled with the input optical waveguide 101 branches the CW optical signal into optical waveguides 102 and 103. The optical modulator 2 is connected to the optical waveguide 102. The optical modulator 3 is connected to the optical waveguide 103. The optical waveguides 104 and 105 are connected to the output sides of the optical modulators 2 and 3 respectively. The optical coupler 5 multiplexes (or connects) CW optical signals propagating through the optical waveguides 104 and 105 so as to output the multiplexed signal to the output optical waveguide 106. The optical phase shifter 4 is attached to the optical waveguide 105. Additionally, the IQ optical modulator 100 includes an electrode 51, a pair of electrodes 61a, 61b, a pair of electrodes 71a, 71b, a pair of electrodes 81a, 81b, and a pair of electrodes 91a, 91b.

In the IQ optical modulator 100, the optical modulator 2 is a MZI-type optical modulator coupled with the optical waveguide 102, wherein it includes an optical coupler 21 configured to further branch the CW optical signal, which is branched by the optical coupler 1, into to CW optical signals, and a pair of optical waveguides 22 and 23 serving as two arms configured to transmit CW optical signals branched by the optical coupler 21. Additionally, the optical modulator 2 includes an optical coupler 24 configured to multiplex (or connect) CW optical signals of two optical waveguides 22 and 23 so as to output the multiplexed signal to the optical waveguide 104. Moreover, the optical modulator 2 is connected to a pair of electrodes 61a, 61b and a pair of electrodes 81a, 81b; hence, the optical modulator 2 shifts the phases of CW optical signals, propagating through the optical waveguides 22 and 23, in response to a drive signal voltage applied to a pair of electrodes 61, 61b and a data bias voltage applied to a pair of electrodes 81a, 81b, thus changing phases by progressing or delaying phases.

Similar to the optical waveguide 2, the optical waveguide 3 is a MZI-type optical modulator. The optical modulator 3 coupled with the optical waveguide 103 includes an optical coupler 31 configured to further branch the CW optical signal, which is branched by the optical coupler 1, into to CW optical signals, and a pair of optical waveguides 32 and 33 serving as two arms configured to transmit the CW optical signals branched by the optical coupler 31. Additionally, the optical modulator 3 includes an optical coupler 34 configured to multiplex (or connect) the CW optical signals of the optical waveguides 32 and 33 so as to output the multiplexed signal to the optical waveguide 105. Moreover, the optical modulator 3 includes a pair of electrodes 71a, 71b and a pair of electrodes 91a, 91b, thus shifting the phases of the CW optical signals propagating through the optical waveguides 32 and 33 in response to a drive signal voltage applied to a pair of electrodes 71a, 71b and a data bias voltage applied to a pair of electrodes 91a, 91b. In this connection, the optical modulators 2 and 3 have the same optical characteristics.

The optical phase shifter 4 coupled with the electrode 51 shifts the phase of the CW optical signal, propagating through the optical waveguide 105, depending on a quadrature bias voltage applied by the terminal 51.

The IQ optical modulator 100 shown in FIGS. 1 and 2 includes four electrodes for drive signals in total, i.e. a pair of electrodes 61a, 61b and a pair of electrodes 71a, 71b which are designed to apply voltages of opposite polarities, i.e. positive/negative polarities, to two waveguides. This type of the IQ optical modulator 100 will be referred to as a dual drive type.

Referring back to FIG. 1, the drive amplifier 6 of the light modulation device 500 includes one input terminal and two output terminals serving as a non-inverting output terminal and an inverting output terminal, wherein the non-inverting output terminal is connected to the electrode 61a while the inverting output terminal is connected to the electrode 61b. The drive amplifier 6 outputs a differential drive signal, i.e. a first 4-value data signal, including voltage signals Data1, ⁻Data1 from the non-inverting output terminal and the inverting output terminal. In the drawings, for example, a reference sign such as "Data1" with an upper bar (⁻) indicates a logical negation of "Data1". In the present specification, for example, the logical-negated sign is denoted as "⁻Data1", i.e. a bar (⁻) followed by characters.

The drive amplifier 7 includes one input terminal and two output terminals, i.e. a non-inverting output terminal and an inverting output terminal, wherein the non-inverting output terminal is connected to the electrode 71a while the inverting output terminal is connected to the electrode 71b. The drive amplifier 7 outputs a differential drive signal, i.e. a second 4-value data signal, including voltage signals Data2, ⁻Data2 from the non-inverting output terminal and the inverting output terminal.

An optical tap 11 is attached to an output optical waveguide 106 of the IQ optical modulator 100 so as to tap, i.e. branch, a CW optical signal output from the IQ optical modulator 100. An OE (Optical Electrical) converter 12 is an example of an optical power monitoring function configured to monitor an optical power. The OE converter 12 coupled with the optical tap 11 detects an optical intensity of the CW optical signal tapped by the optical tap 11 so as to convert the detected optical intensity into an electric signal, which is then output to a synchronous detection circuit 202. The OE converter 12 needs a frequency band ranging from DC to kHz, which can be set to a further low-speed value than a baud rate of a drive signal. Based on a reference clock (RefCLK: Reference Clock) signal supplied from a clock (clk) terminal, the synchronous detection circuit 202 synchronously-detects an intensity modulation component, synchronized with the reference clock signal, or its integer multiples of high-degree waves from an electric signal representing an optical intensity of a CW optical signal supplied from a data (data) terminal, thus outputting the information of synchronous detection results.

A control circuit 200 includes a bias control circuit 210, a synthesizer 211, and a controller 212. In the control circuit 200, the controller 212 outputs three types of synchronization signals, showing time-sharing switching of adjustment periods for three bias voltages $V_{bias1}$, $V_{bias2}$, $V_{bias3}$, to the bias control circuit 210 and the synthesizer 211 at the same timing.

Upon receiving a first synchronization signal from the controller 212, the synthesizer 211 generates and outputs a dither signal of $\cos(w_d \cdot t)$ and a reference clock signal to an adder 86 and the synchronous detection circuit 202. Upon receiving a second synchronization signal from the controller 212, the synthesizer 211 generates and outputs a dither signal of $\sin(w_d \cdot t)$ and a reference clock signal to an adder 96 and the synchronous detection circuit 202. Upon receiving a third synchronization signal from the controller 212, the synthesizer 211 generates dither signals of $\cos(w_d/2 \cdot t)$ and $\sin(w_d/2 \cdot t)$ and a reference clock signal of $\sin(w_d \cdot t)$. The synthesizer 211 outputs a dither signal of $\cos(w_d/2 \cdot t)$ to the adder 86, the dither signal of $\sin(w_d/2 \cdot t)$ to the adder 96, and the reference clock signal of $\sin(w_d \cdot t)$ to the synchronous detection circuit 202. In this connection, a dithering amplitude is set in advance to a certain value not causing degradation of signal quality in 16-value QAM signals. The angular frequency $w_d$ is set to a certain value sufficiently smaller than a baud rate of a 16-value QAM signal, thus suppressing frequency in a kilo-hertz order.

Upon receiving the first synchronization signal from the controller 212, the bias control circuit 210 determines whether $V_{bias1}$ is larger or smaller than an appropriate value based on the synchronous detection result of the synchronous detection circuit 202, thus outputting a control signal to the bias power supply 8. Thus, the bias control circuit 210 carries out feedback control to adjust the data bias voltage Vbias1. Upon receiving the second synchronization signal from the controller 212, the bias control circuit 210 determines whether Vbias2 is larger or smaller than an appropriate value based on the synchronous detection result of the synchronous detection circuit 202, thus outputting an output signal to the bias power supply 9. Thus, the bias control circuit 210 carries out feedback control to adjust the data bias voltage Vbias2. Upon receiving the third synchronization signal from the controller 212, the bias control circuit 210 determines whether Vbias3 is larger or smaller than an appropriate value based on the synchronous detection result of the synchronous detection circuit 202, thus outputting a control signal to the bias power supply 10; hence, the bias control circuit 210 carries out feedback control to adjust the quadrature bias voltage Vbias3. The processes of adjusting three bias voltages are changed over and repeatedly carried out every time the controller 212 supplies a synchronization signal. In this connection, each control signal has information indicating whether or not the synchronous detection result produces an appropriate value for each bias, i.e. the information instructing an increase or a decrease in a voltage.

The bias power supplies 8, 9, 10 are bias voltage outputting parts for outputting bias voltages, i.e. two data bias voltages $V_{bias1}$, $V_{bias2}$ and one quadrature bias voltage $V_{bias3}$, to their output terminals. Additionally, the bias power supplies 8, 9, 10 adjusts voltages by increasing or decreasing voltages in accordance with control signals output from the bias control circuit 210.

The adders 86 and 96 exemplifies a dither signal applying function of applying a dither signal. The adder 86 applies a dither signal, supplied from the synthesizer 211, to the data bias voltage $V_{bias1}$, output from the bias power supply 8, which is then output to a differential amplifier 85. The adder 96 applies a dither signal, supplied from the synthesizer 211, to the data bias voltage $V_{bias2}$, output from the bias power supply 9, which is then output to a differential amplifier 95.

The differential amplifier 85 includes an input terminal connected to the adder 86, a non-inverting output terminal connected to the electrode 81a, and an inverting output terminal connected to the electrode 81b, and therefore the differential amplifier 85 differentially amplifies the output signal of the adder 86 so as to output data bias voltages $-V\phi_{bias1}$ from the non-inverting output terminal and the inverting output terminal. The differential amplifier 85 applies $-V\phi_{bias1}$ to the electrodes 81a, 81b so as to add phase shifts of $-q\phi_1$ to CW optical signals propagating through the optical waveguides 22 and 23.

The differential amplifier 95 includes an input terminal connected to the adder 96, a non-inverting output terminal connected to the electrode 91a, and an inverting output terminal connected to the electrode 91b. The differential amplifier 95 differentially amplifies the output signal of the adder 96 so as to output data bias voltages $-V\phi_{bias2}$ from the non-inverting output terminal and the inverting output terminal. The differential amplifier 95 applies $-V\phi_{bias2}$ to the electrodes 91a, 91b so as to add phase shifts of $-q\phi_2$ to CW optical signals propagating through the optical waveguides 32 and 33.

In the above, $V_{bias1}$ and $V_{bias2}$ are subjected to feedback control targeting the null points of the optical modulators 2 and 3. That is, $V_{bias1}$ is controlled to turn off the output light of the optical modulator 2 when the drive amplifier 6 generates a differential voltage at zero while $V_{bias2}$ is controlled to turn off the output light of the optical modulator 3 when the drive amplifier 7 generates a differential voltage at zero.

The following description refers to the relationship, concerning optical phases and optical intensities, between the optical modulator 2, relating to the first 4-value data signal including voltage signals Data1 and ⁻Data1 output from the non-inverting output terminal and the inverting output terminal of the drive amplifier 6, and the optical modulator 3, relating to the second 4-value data signal including voltage signals Data2 and ⁻Data2 output from the non-inverting output terminal and the inverting output terminal of the drive amplifier 7. The optical modulator 2 is driven by the first 4-value data signal Data1, ⁻Data1. The optical modulator 3 is driven by the second 4-value data signal Data2, ⁻Data2. These data signals are 4-value NRZ (Non Return-to-Zero) signals. The drive amplifier 6 amplifies the first 4-value data signal in two types, i.e. a positive phase and a negative phase, so as to generate Data1, ⁻Data1 output to the optical modulator 2. The drive amplifier 7 amplifies the second 4-value data signal in two types, i.e. a positive phase and a negative phase, so as to generate Data2, ⁻Data2 output to the optical modulator 3.

The first 4-value data signal Data1, ⁻Data1 is applied to the optical waveguides 22 and 23 of the optical modulator 2 through the electrodes 61a and 61b, thus causing phase shifts of $-f_1$ in CW optical signals propagating through the optical waveguides 22 and 23. The second 4-value data signal Data2, ⁻Data2 is applied to the optical waveguides 32 and 33 of the optical modulator 3 through the electrodes 71a and 71b, thus causing phase shifts of $-f_2$ in CW optical signals propagating through the optical waveguides 32 and 33. The values of phase delays $f_1$ and $f_2$ are varied depending on four values indicated by each data signals. Thus, it is possible to generate a 16-value QAM signal based on combinations of the first 4-value data signal Data1, ⁻Data1, input to the drive amplifier 6, and the second 4-value data signal Data2, ⁻Data2 input to the drive amplifier 7.

The drive amplifier 6 generates a differential signal (Data1-⁻Data1) representing four types of signal levels $V_0$, $V_1$, $-V_1$, $-V_0$ where $V_0 > V_1 > -V_1 > -V_0$. As described above, the optical modulators 2 and 3 have the same optical characteristics; hence, the drive amplifier 7 generates a differential signal (Data2-⁻Data2) representing four types of signal levels $V_0$, $V_1$, $-V_1$, $-V_0$. At this time, the optical modulators 2 and 3 make settings such that the maximum amplitudes of the differential outputs of the drive amplifiers 6 and 7 will not exceed the foregoing half-wavelength voltage $V_p$. This concludes $2V_p \ddagger V_0 - (-V_0) = 2V_0$.

(Outline of Bias Voltage Adjusting Methods)

The bias voltage adjusting method of the light modulation device 500 will be described below. The light modulation device 500 adjusts bias voltages by detecting bias drifts in the data bias voltages $V_{bias1}$, $V_{bias2}$ and the quadrature bias voltage $V_{bias3}$, and therefore the light modulation device 500 carries out processes of setting appropriate values by increasing or decreasing values in a time-sharing manner. To adjust the data bias voltage $V_{bias1}$, the control circuit 200 generates a dither signal representing $\cos(w_d \cdot t)$ so as to apply the dither signal to the data bias voltage $V_{bias1}$. The synchronous detection circuit 202 synchronously-detects an intensity modulation component synchronized with $\cos(w_d \cdot t)$ superposed on the optical output of the IQ optical modulator 100, and therefore the control circuit 200 adjusts $V_{bias1}$ such that the synchronous detection result will become zero. Herein, t represents a variable of time while $w_d$ represents an angular frequency, wherein the relationship between the reference clock signal and the frequency $f_d$ is $f_d = w_d/2p$. Additionally, the dithering amplitude is set in advance not to cause degradation of signal quality in 16-value QAM signals. The value of the angular frequency $w_d$ is set to be sufficiently smaller than the baud rate of a 16-value QAM signal, and therefore $w_d$ is suppressed in a kilo-hertz order.

To adjust the data bias voltage $V_{bias2}$, the control circuit 200 generates a dither signal representing $\sin(w_d \cdot t)$ so as to apply the dither signal to the data bias voltage $V_{bias2}$. The synchronous detection circuit 202 synchronously-detects an intensity modulation component synchronized with $\sin(w_d \cdot t)$ superposed on the optical output of the IQ optical modulator 100, and therefore the control circuit 200 adjusts Vbias2 such that the synchronous detection result will become zero.

To adjust the quadrature bias voltage $V_{bias3}$, the control circuit 200 generates a dither signal representing $\cos(w_d/2 \cdot t)$ and a dither signal representing $\sin(w_d/2 \cdot t)$. The control circuit 200 applies the dither signal of $\cos(w_d/2 \cdot t)$ to the data bias voltage $V_{bias1}$ while applying the dither signal of $\sin(w_d/2 \cdot t)$ to the data bias voltage $V_{bias2}$. The synchronous detection circuit 202 synchronously-detects an intensity modulation component synchronized with $\sin(w_d \cdot t)$ superposed on the optical output of the IQ optical modulator 100, and therefore the control circuit 200 adjusts the quadrature bias voltage Vbias3 such that the synchronous detection result will become zero. The above process is repeatedly carried out so as to sequentially adjust $V_{bias1}$, $V_{bias2}$, $V_{bias3}$.

Due to the above adjustment, it is possible to limit the synchronous detection circuit 202 to detect a single angular frequency $w_d$; hence, it is possible to simplify the configuration of device while reducing the scale of device.

(Process of Adjusting Bias Voltages)

The process of adjusting bias voltages $V_{bias1}$, $V_{bias2}$, $V_{bias3}$ by the light modulation device 500 will be described with reference to FIGS. 1 and 2.

A CW optical signal propagating through the input optical waveguide 101 is supplied to the IQ optical modulator 100, wherein the CW optical signal is branched into the optical waveguides 102 and 103 by the optical coupler 1; hence, CW optical signals propagate through the optical modulators 2 and 3. The CW optical signal supplied to the optical modulator 2 is branched into the optical waveguides 22 and 23 by the optical coupler 21 while the CW optical signal supplied to the optical modulator 3 is branched into the optical waveguides 32 and 33 by the optical coupler 31. The voltages Data1 and ⁻Data1 applied to the electrodes 61a and 61b by the drive amplifier 6 are applied to the optical waveguides 22 and 23 of the optical modulator 2 in the IQ optical modulator 100, thus causing phase shifts of $-f_1$ in the CW optical signals propagating through the optical waveguides 22 and 23. The voltages Data2 and ⁻Data2 applied to the electrodes 71a and 71b by the drive amplifier 7 are applied to the optical waveguides 32 and 33 of the optical modulator 3 in the IQ optical modulator 100, thus causing phase shifts of $-f_2$ in the CW optical signals propagating through the optical waveguides 32 and 33.

(Adjustment of Bias Power Supply 8)

Upon starting the light modulation device 500, the bias power supplies 8, 9, and 10 do not generate optimum values for the data bias voltage $V_{bias1}$, $V_{bias2}$ and the quadrature bias voltage $V_{bias3}$; hence, it is necessary to adjust bias voltages irrespective of the presence/absence of bias drifts. At first, the controller 212 outputs a first synchronization signal to the bias control circuit 210 and the synthesizer 211.

Upon receiving the first synchronization signal, the synthesizer 211 generates a dither signal representing $\cos(w_d \cdot t)$ and a reference clock signal, which are supplied to the adder 86 and the synchronous detection circuit 202 respectively. The adder 86 carries out dithering to apply the dither signal of $\cos(w_d \cdot t)$ to the data bias voltage Vbias1 output from the bias power supply 8, thus supplying an output signal to the differential amplifier 85. The differential amplifier 85 applies $V\cancel{c}_{bias1}$ and $-V\cancel{c}_{bias1}$ to the electrodes 81a and 81b, and therefore the optical modulator 2 applies phase shifts of $-q\cancel{c}_1$ to the optical signals propagating through the optical waveguides 22 and 23. Then, the optical signals propagating through the optical waveguides 22 and 23 are multiplexed (or connected) together by the optical coupler 24.

The bias power supply 9 outputs a DC voltage as the data bias voltage $V_{bias2}$. The adder 96 adds the dither signal output from the synthesizer 211 to the data bias voltage $V_{bias2}$ output from the bias power supply 9 so as to output an addition result. During the adjustment period of the bias power supply 8, no dither signal is supplied to the adder 96, which thus directly outputs the data bias voltage $V_{bias2}$ to the differential amplifier 95. The differential amplifier 95 applies $V\phi_{bias2}$ and $-V\phi_{bias2}$ to the electrodes 91a and 91b, and therefore the optical modulator 3 applies phase shifts of $-q\phi_2$ to the optical signals propagating through the optical waveguides 32 and 33. The optical signals propagating through the optical waveguides 32 and 33 are multiplexed (or connected) by the optical coupler 34.

The bias power supply 10 outputs a DC voltage as the quadrature bias voltage Vbias3. When the quadrature bias voltage $V_{bias3}$ is applied to the electrode 51, the optical phase shifter 4 applies a phase shift of $q_3$ to a CW optical signal propagating through the optical waveguide 105. As described above, $q_3$ is equal to $-p/2$ at the optimum value of Vbias3. Upon starting the light modulation device 500, however, $V_{bias3}$ does not have an optimum value; hence, $q_3$ does not necessarily equal to $-p/2$. The optical coupler 5, serving as a multiplexer configured to generate QAM signals, multiplexes (or connects) CW optical signals propagating through the optical waveguides 104 and 105 so as to generate a QAM signal, which is then output to the output optical waveguide 106.

The OE converter 12 detects an optical intensity of a CW optical signal tapped by the optical tap 11 so as to output the optical intensity to the synchronous detection circuit 202. The synchronous detection circuit 202 synchronously-detects an intensity modulation component, synchronized with the reference clock signal of $\cos(w_d\cdot t)$ output from the synthesizer 211, from the output signal of the OE converter 12. The synchronous detection circuit 202 outputs the synchronous detection result to the bias control circuit 210. Upon receiving the information representing the synchronous detection result, the bias control circuit 210 outputs to the bias power supply 8 a control signal for adjusting, i.e. increasing or decreasing, the data bias voltage $V_{bias1}$ output from the bias power supply 8 such that the synchronous detection result will become zero. As a result, the data bias voltage $V_{bias1}$ will approach an appropriate value.

(Adjustment of Bias Power Supply 9)

Due to a lapse of a certain period which is determined in advance, the adjustment period of the bias power supply 8 is terminated so that the bias power supply 9 enters into a data bias voltage adjusting period, and therefore the controller 212 outputs a second synchronization signal to the bias control circuit 210 and the synthesizer 211. Upon receiving the second synchronization signal, the synthesizer generates a dither signal of $\sin(w_d\cdot t)$ and a reference clock signal, which is supplied to the adder 96 and the synchronous detection circuit 202. In the adjustment period of the bias power supply 9, the synthesizer 211 does not apply a dither signal of $\cos(w_d\cdot t)$ to the adder 86. At this time, the bias power supplies 8, 9, 10 hold bias voltages just before transmitting the second synchronization signal. The adder 96 carries out dithering to apply a dither signal representing $\sin(w_d\cdot t)$ to the data bias voltage $V_{bias2}$ output from the bias power supply 9, thus outputting the addition result to the differential amplifier 95. When the differential amplifier 95 applies $V\phi_{bias2}$ and $-V\phi_{bias2}$ to the electrodes 91a and 91b, the optical modulator 3 applies phase shifts of $-q\phi_2$ to the optical signals propagating through the optical waveguides 32 and 33. The optical coupler 34 multiplexes (or connects) the optical signals propagating through the optical waveguides 32 and 33.

The bias power supply 10 continuously outputs a DC voltage as the quadrature bias voltage $V_{bias3}$, and therefore the optical phase shifter 4 applies a phase shift $q_3$ to a CW optical signal propagating through the optical waveguide 105. The optical modulator 2 continuously applies phase shifts of $-q\phi_1$ to the optical signals propagating through the optical waveguides 22 and 23, and therefore the optical coupler 24 multiplexes (or connects) the optical signals propagating through the optical waveguides 22 and 23. The optical coupler 5 multiplexes (or connects) the CW optical signals propagating through the optical waveguides 104 and 105, thus outputting the multiplexed signal to the output optical waveguide 106. The OE converter 12 detects an optical intensity of a CW optical signal tapped by the optical tap 11 so as to output the optical intensity to the synchronous detection circuit 202. The synchronous detection circuit 202 synchronously-detects an intensity modulation component, synchronized with the reference clock signal of $\sin(w_d\cdot t)$ output from the synthesizer 211, from the output signal of the OE converter 12. The synchronous detection circuit 202 outputs the information representing the synchronous detection result to the bias control circuit 210. Upon receiving the synchronous detection result, the bias control circuit 210 outputs to the bias power source 9 a control signal for adjusting, i.e. increasing or decreasing, the data bias voltage $V_{bias2}$ output from the bias power supply 9 such that the synchronous detection result will become zero. As a result, the data bias voltage $V_{bias2}$ will approach an appropriate value.

(Adjustment of Bias Power Supply 10)

Due to a lapse of a certain period which is determined in advance, the adjustment period of the bias power supply 9 is terminated, and therefore the bias power supply 10 enters into the data bias voltage adjusting period, wherein the controller 212 outputs a third synchronization signal to the bias control circuit 210 and the synthesizer 211. Upon receiving the third synchronization signal, the synthesizer 211 outputs a dither signal of $\cos(w_d/2\cdot t)$ to the adder 86, a dither signal of $\sin(w_d/2\cdot t)$ to the adder 96, and a reference clock signal of $\sin(w_d\cdot t)$ to the synchronous detection circuit 202. At this time, the bias power supplies 8, 9, 10 hold bias voltages just before transmitting the third synchronization signal.

The adder 86 carries out dithering to apply the dither signal of $\cos(w_d/2\cdot t)$ to the data bias voltage $V_{bias1}$ output from the bias power supply 8, thus outputting a dithering-applied signal to the differential amplifier 85. The differential amplifier 85 applies $V\phi_{bias1}$ and $-V\phi_{bias1}$ to the electrodes 81a and 81b, and therefore the optical modulator 2 applies phase shifts of $-q\phi_1$ to the optical signals propagating through the optical waveguides 22 and 23. The optical coupler 24 multiplexes (or connects) the optical signals propagating through the optical waveguides 22 and 23.

The adder 96 carries out dithering to apply the dither signal of $\sin(w_d/2\cdot t)$ to the data bias voltage $V_{bias2}$ output from the bias power supply 9, thus outputting a dithering-applied signal to the differential amplifier 95. The differential amplifier 95 applies $V\phi_{bias2}$ and $-V\phi_{bias2}$ to the electrodes 91a and 91b, and therefore the optical modulator 3 applies phase shifts of $-q\phi_2$ to the optical signals propagating through the optical waveguides 32 and 33. The optical coupler 34 multiplexes (or connects) the optical signals propagating through the optical waveguides 32 and 3.

The bias power supply 10 continuously outputs a DC voltage as the quadrature bias voltage $V_{bias3}$. When the quadrature bias voltage $V_{bias3}$ is applied to the electrode 51, the optical shifter 4 applies a phase shift $q_3$ to a CW optical signal propagating through the optical waveguide 105. The optical coupler 5 multiplexes (or connects) CW optical signals propagating through the optical waveguides 104 and 105, thus outputting a multiplexed signal to the output optical waveguide 106. The OE converter 12 detects an optical intensity of a CW optical signal tapped by the optical tap 11 so as to output the optical intensity to the synchronous detection circuit 202. The synchronous detection circuit 202 synchronously-detects an intensity modulation component, synchronized with the reference clock signal of $\sin(w_d \cdot t)$ output from the synthesizer 211, from the output signal of the OE converter 12. The synchronous detection circuit 202 outputs the information representing the synchronous detection result to the bias control circuit 210. Upon receiving the synchronous detection result, the bias control circuit 210 outputs to the bias power supply 10 a control signal for adjusting, i.e. increasing or decreasing, the quadrature bias voltage $V_{bias3}$ output from the bias power supply 10 such that the synchronous detection result will become zero. As a result, the quadrature bias voltage $V_{bias3}$ approaches an appropriate value.

By cyclically repeating the three types of adjustment periods, it is possible to converge bias voltages to optimum values. Additionally, it is possible to hold bias voltages at the optimum values even when bias drifts occur during operation. The first embodiment is designed to stop applying a dither signal to the adder 96 during the adjustment period of the bias power supply 8 while stopping applying a dither signal to the adder 86 during the adjustment period of the bias power supply 9. However, it is possible to design another configuration which applies a dither signal of $\sin(w_d \cdot t)$ to the adder 96 during the adjustment period of the bias power supply 8 while applying a dither signal of $\cos(w_d \cdot t)$ to the adder 86 during the adjustment period of the bias power supply 9. In this configuration, theoretically, no mutual interference occurs in the synchronous detection circuit 202 due to the orthogonality between $\sin(w_d \cdot t)$ and $\cos(w_d \cdot t)$, thus causing no impact on bias monitoring. This configuration allows any dither signal to flow through connections from the bias control circuit 210 to the adders 86 and 96 during the overall period of time. This may achieve an effect of precluding the circuitry configured to hold potentials at the ground level while eliminating any period causing unstable potential.

In the first embodiment, the controller 212 outputs a synchronization signal in each adjustment period. Upon receiving a synchronization signal, the synthesizer 211 supplies a reference clock signal which is determined in advance with respect to each period. Upon receiving the synchronization signal, the bias control circuit 210 sequentially adjusts the bias voltages output from the bias power supplies 8, 9, 10, in their periods, based on the information representing the synchronous detection result of the synchronous detection circuit 202 such that the synchronous detection result will become zero. Additionally, the adders 86 and 96 carry out dithering on data bias voltages output from the bias power supplies 8 and 9. Based on a dithering-applies signal and a reference clock signal output from the synthesizer 211, the synchronous detection circuit 202 detects drifts occurring in the bias power supplies 8, 9, 10, thus feeding back the drifting state as the synchronous detection result to the bias control circuit 210. This makes it possible to limit the synchronous detection circuit 202 to detect a single angular frequency $w_d$; hence, it is possible to simplify the configuration of device while reducing the scale of device. Solely using a single synchronous detection circuit 202 without changing its characteristics, it is possible to realize bias control using asynchronous bias dithering. By sequentially repeating the adjustment periods for three bias voltages, it is possible to compensate for drifts occurring in three bias voltages irrespective of occurrence of bias drifts, thus normally holding bias values at optimum conditions. In short, it is possible to realize the configuration of detecting and correcting drifts occurring in multiple bias voltages by way of synchronous detection of dither signal components superposed on optical QAM signals by simply carrying out synchronous detection using a single frequency $f_d$.

In general, as described above, bias voltages are not necessarily set to optimum values when starting the light modulation device 500. By carrying out the bias voltage adjusting process using the configuration of the first embodiment, it is possible to converge bias voltages to optimum values.

Non-Patent Literature Document 1 discloses a monitoring means of bias conditions which needs synchronous detection at two types of frequencies. In contrast, the configuration of the first embodiment can realize the monitoring means of bias conditions, disclosed by Non-Patent Literature Document 1, while limiting the synchronous detection circuit 202 to detect a single angular frequency $w_d$; hence, it is possible to simplify the configuration of device while reducing the scale of device.

Second Embodiment

Figure 3:
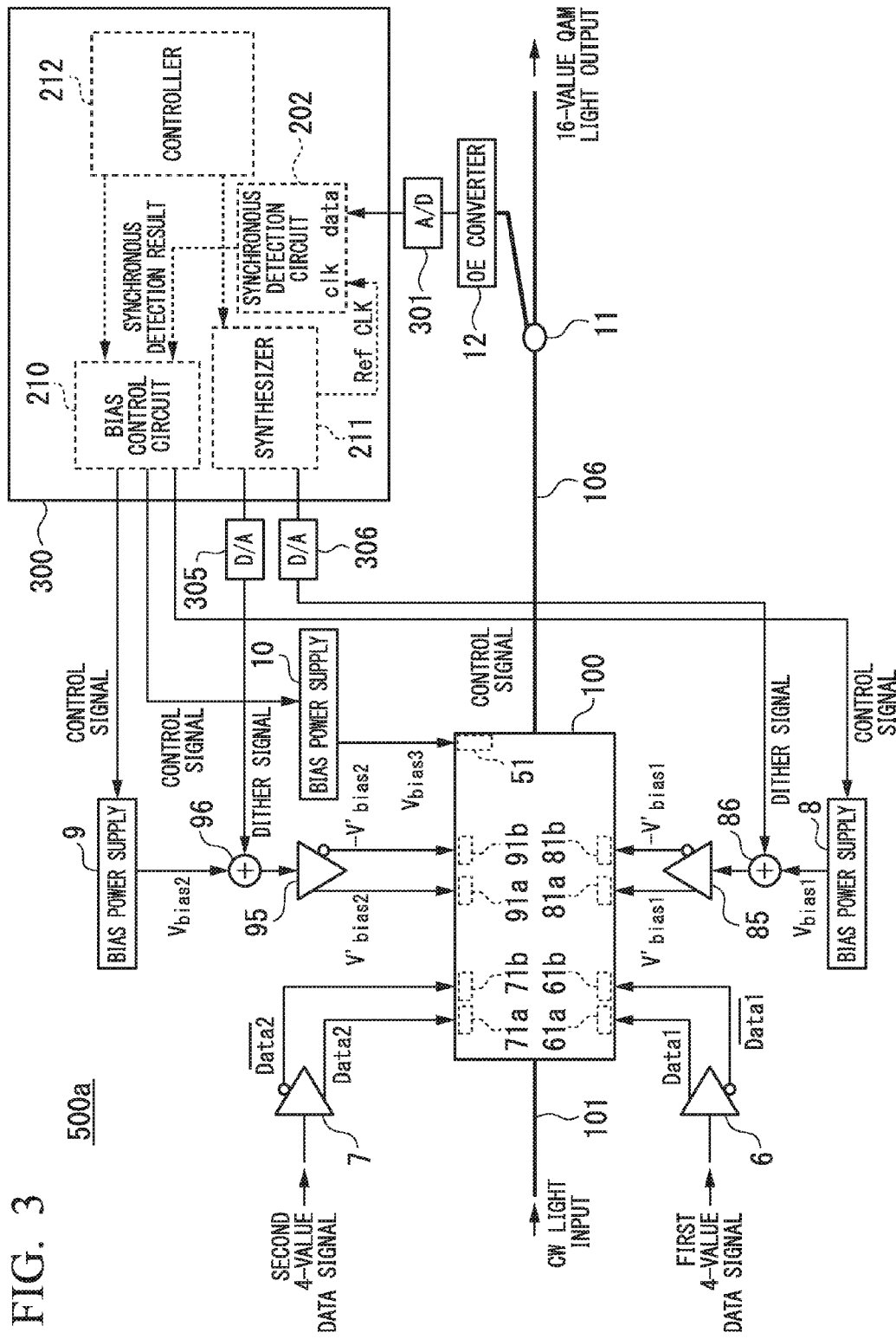
FIG. 3 is a block diagram showing the configuration of a light modulation device according to a second embodiment of the present invention.

FIG. 3 is a block diagram showing the configuration of a light modulation device 500a according to the second embodiment of the present invention. In the second embodiment, the same reference signs are applied to the same configuration as the first embodiment; hence, different configurations will be described below. The second embodiment unifies the configuration of the control circuit 200, i.e. the bias control circuit 210, the synthesizer 211, and the controller 212, as well as the synchronous detection circuit 202 according to the first embodiment into a digital circuit 300. The digital circuit 300 may be configured of a personal computer or a FPGA (Field Programmable Gate Array) and a DSP (Digital Signal Processor). Additionally, the light modulation device 500a of the second embodiment includes an A/D (Analog/Digital) converter 301, and D/A (Digital/Analog) converters 305, 306. The A/D converter 301 together with the OE converter 12 is connected to a data terminal of the synchronous detection circuit 202 in the digital circuit 300.

The D/A converters 305 and 306 are connected to the output terminals of the synthesizer 211 of the digital circuit 300 and the adders 86 and 96.

Thus, analog signals supplied to the digital circuit 300 are converted into digital signals, while digital signals output from the digital circuit 300 are converted into analog signals. In the first embodiment, the bias control circuit 210 supplies analog signals, i.e. control signals, to the bias power supplies 8, 9, 10 while the bias power supplies 8, 9, 10 converts their output voltages via digital circuits, it is necessary to interpose D/A converters between the bias control circuit 210 and the bias power supplies 8, 9, 10. The operation of the light modulation device 500a of the second embodiment is similar to the first embodiment except that the digital circuit 300 implements the processes implemented by the bias control circuit 202, the synthesizer 211, and the controller 212 according to the first embodiment.

According to the second embodiment, it is possible to realize the digital circuit 300 including the bias control circuit 210, the synthesizer 211, the controller 212, and the synchronous detection circuit 202. Therefore, similar to the first embodiment, it is possible to limit the synchronous detection circuit 202 to detect a single angular frequency $w_d$. Owing to the configuration of the digital circuit 300, it is possible to further simplify the configuration of device while reducing the scale of device. That is, the digital circuit 300 needs to configure a single synchronous detection function; hence, this makes it possible to control bias voltages using asynchronous bias dithering. By sequentially repeating the adjustment periods for three bias voltages, it is possible to compensate for drifts occurring in three bias voltages, thus setting bias voltages to appropriate values.

Third Embodiment

Figure 4:
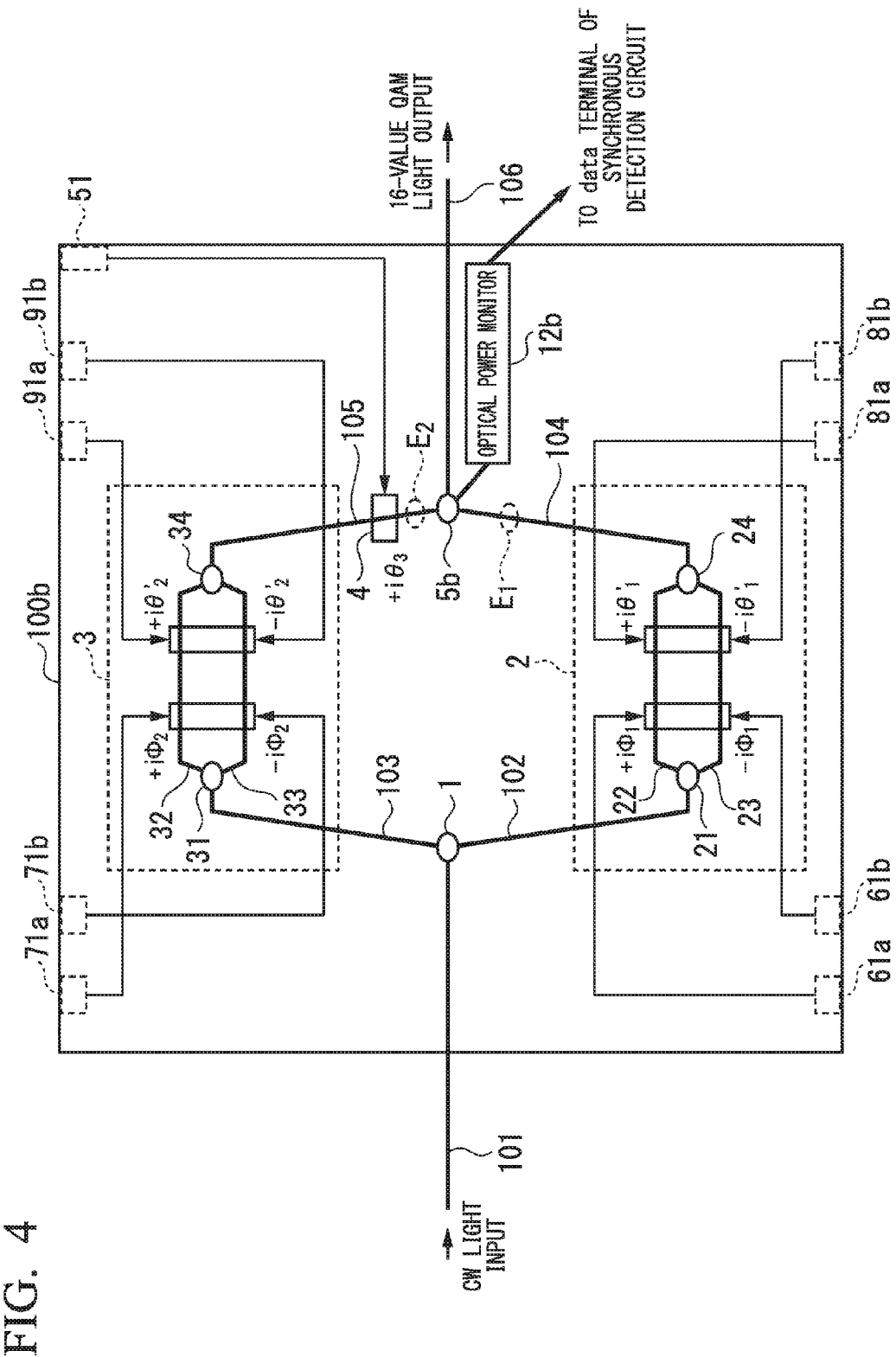
FIG. 4 is a block diagram showing the configuration of a light modulation device according to a third embodiment of the present invention.
Figure 5:
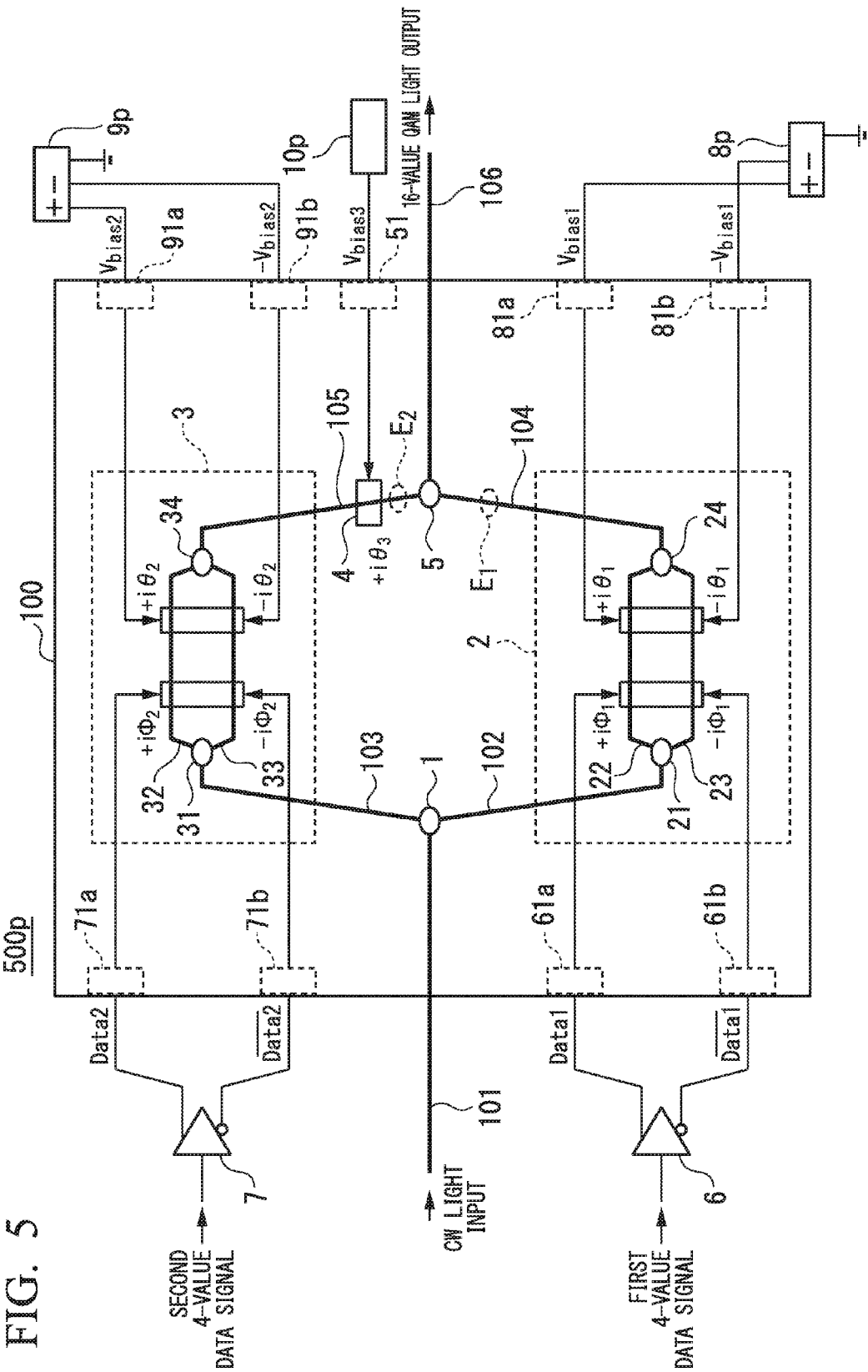
FIG. 5 is a block diagram showing the configuration of the conventional light modulation device.
Figure 6:
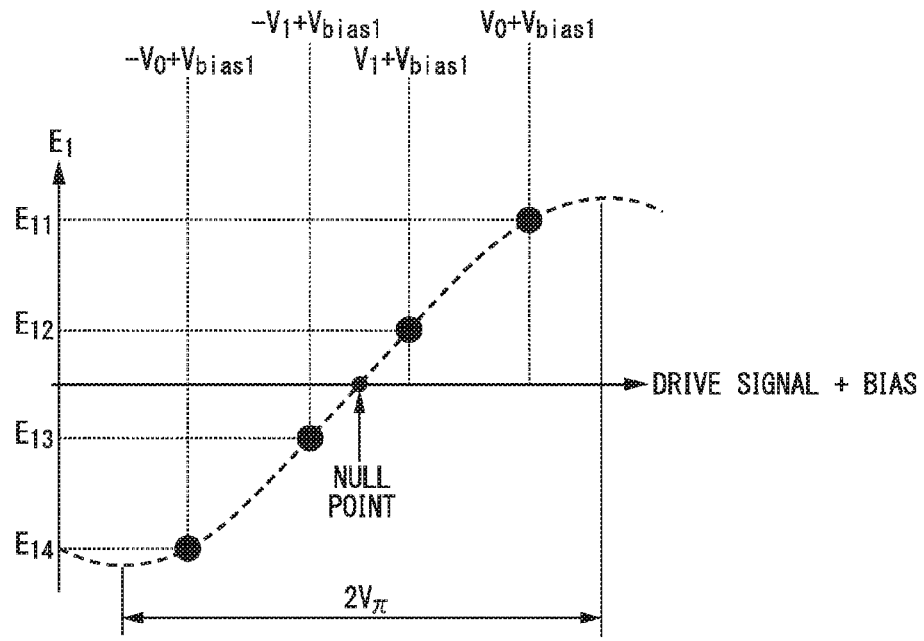
FIG. 6 is a graph showing characteristics of a light modulation device not undergoing any bias drift.
Figure 7:
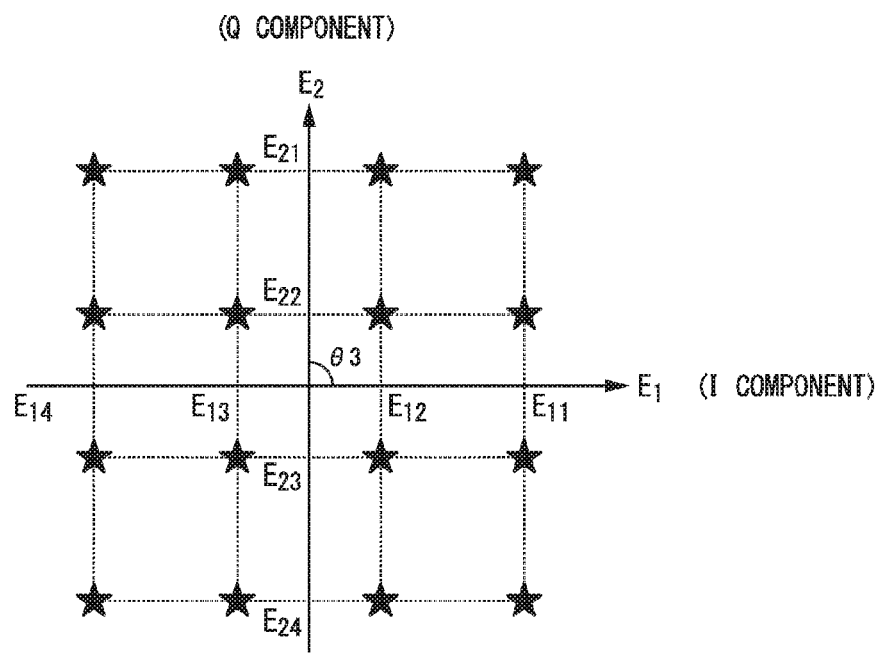
FIG. 7 is a graph showing a constellation not undergoing any bias drift.

FIG. 4 is a block diagram showing the configuration of an IQ optical modulator 100b included in a light modulation device according to the third embodiment of the present invention. In the third embodiments, the same reference signals are applied to the same configuration as the first embodiment; hence, different configurations will be described below.

The IQ optical modulator 100b of the third embodiment includes an optical coupler 5b and an optical power monitor 12b. That is, the IQ optical modulator 100b is configured such that the optical modulator 2 for I components, the optical modulator 3 for Q components, the optical phase shifter 4, and the optical power monitor 12b are formed in the same optical integrated circuit. The optical coupler 5b is connected to the optical waveguides 104 and 105 so as to multiplex (or connect) CW optical signals propagating through the optical waveguides 104 and 105, thus outputting a multiplexed CW optical signal to the output optical waveguide 106. The optical coupler 5b taps and outputs the multiplexed CW optical signal to the optical power monitor 12b. For example, the same function as the OE converter 12 is applied to the optical power monitor 12b, which is connected to the optical coupler 5b and the data terminal of the synchronous detection circuit 202. The optical power monitor 12b detects an optical intensity of the tapped CW optical signal so as to convert the optical intensity into an electric signal, which is output as the converted optical intensity. That is, the IQ optical modulator 100b incorporates the optical tap 11 and the OE converter 12 according to the first embodiment. The overall configuration of the light modulation device of the third embodiment is configured to preclude the optical tap 11 and the OE converter 12 from the light modulation device 500 of FIG. 1 while providing optical waveguides connected between the IQ optical modulator 100b and the synchronous detection circuit 202.

As described above, the third embodiment can preclude the optical tap 11 and the OE converter 12 from the foregoing configuration; hence, similar to the first embodiment, the third embodiment can limit the synchronous detection circuit 202 to detect a single angular frequency $w_d$. Most of light modulation devices sold in markets are designed to incorporate optical power monitors similar to the third embodiment; hence, by selecting those devices, it is possible to further simplify the configuration of device while reducing the scale of device. By sequentially repeating the adjustment periods for three bias voltages, it is possible to compensate for drifts occurring in three bias voltages, thus setting bias voltages to appropriate values.

In the above, the first, second, and third embodiments are configured to generate 16-value QAM signals, but they can be reconfigured to generate 4-value QAM signals or other multivalued QAM signals. In particular, the present invention can be effectively applied to the configuration of transmitting multivalued QAM signals with the number of values equal to or larger than four values.

In the first, second, and third embodiments, the synthesizer 211 adopts the relationship between an angular frequency $w_{d12}$ for dither signals used to detect drifts occurring in $V_{bias1}$ and $V_{bias2}$ and an angular frequency $w_{d3}$ for a dither signal used to detect any drift occurring in $V_{bias3}$, i.e. $w_{d12}=w_{d3} \cdot 2$; however, it is possible to adopt another relationship of $w_{d12}=w_{d3} \cdot x$ (where x is a positive integer equal to or other than 1). The relationship of the frequencies of reference clock signals, i.e. $f_{d12}$ (=$w_{d12}/2p$) and $f_{d3}$ (=$w_{d3}$) in comparison with an arbitrarily selected frequency $f_d$, can be expressed as $f_{d12}=f_d/n$ (where n is a positive integer equal to or larger than 1) and $f_{d3}=f_d/m$ (where m is a positive integer equal to or larger than 1, and n<m). Herein, n and m can be set to any natural numbers, but it is preferable to set n and m to smaller natural numbers as possible or specific natural numbers satisfying the condition of n<m.

In the first, second, and third embodiments, three bias voltage adjusting processes are repeated in the order of the bias power supply 8, the bias power supply 9, and the bias power supply 10; but this order is not a restriction; hence, it is possible to employ any order as long as the adjustment periods are determined. For example, it is possible to change the order via user's setting such that the controller 212 can output a synchronization signal including the information of identifying the bias voltage supplies 8, 9, 10 subjected to adjustments.

In the first, second, and third embodiments, the synthesizer 211 is designed to output a dither signal of $\cos(w_d \cdot t)$ during the period of adjusting the data bias voltage $V_{bias1}$ output from the bias voltage supply 8. For this reason, the synchronous detection circuit 202 needs to detect two types of dither signals, i.e. $\cos(w_d \cdot t)$ and $\sin(w_d \cdot t)$. Since each of $\cos(w_d \cdot t)$ and $\sin(w_d \cdot t)$ corresponds to a dither signal having the same angular frequency; hence, it is possible to detect dither signals, by changing their phases by 90, with a single synchronous detection circuit, i.e. the synchronous detection circuit 202. In the present invention, the first, second, and third embodiments are designed to output a dither signal for each adjustment period; hence, those embodiments can be redesigned to output a dither signal of $\sin(w_d \cdot t)$ in adjusting the bias power supply 8. In this case, the synchronous detection circuit 202 carries out synchronous detection using a reference clock signal of $\sin(w_d \cdot t)$ in adjusting any one of the bias power supplies 8, 9, 10. By employing another configuration reverse to the above configuration, it is possible for the synchronous detection circuit 202 to carry out synchronous detection using a reference clock signal of $\cos(w_d \cdot t)$ in adjusting any one of the bias power supplies 8, 9, 10. Additionally, it is necessary that dither signals supplied to the bias power supplies 8 and 9 be orthogonal to each other in phase in adjusting the quadrature bias voltage Vbias3 output from the bias power supply 10. For this reason, it is possible to apply a dither signal of $\sin(w_d/2 \cdot t)$ to the bias power supply 8 while applying a dither signal of $\cos(w_d/2 \cdot t)$ to the bias power supply 9.

In the IQ optical modulators 100 and 100b according to the first, second, and third embodiments, the optical phase shifter 4 is disposed in the latter stage of the optical modulator 3, and therefore the optical phase shifter 4 carries out a phase shift of $q_3$ (=p/2) such that the optical modulator 2 modulates I components while the optical modulator 3 modulates Q components. The present invention is not necessarily limited to the foregoing embodiments. As long as a phase difference of p/2 is secured between the optical modulators 2 and 3, it is possible to employ any configuration; that is, it is possible to dispose the optical phase shifter 4 at the latter stage of the optical modulator 2; it is possible to dispose the optical phase shifter 4 at the former stage, instead of the latter stage, of the optical modulator 2 or 3; and it is possible to dispose the optical phase shifter 4 at the former stage or the latter stage in both the optical modulators 2 and 3.

In the first, second, and third embodiments, the IQ optical modulators 100 and 100b are each configured of a dual-drive type modulator, however, which can be changed with a single-drive type modulator. The single-drive type employs two electrodes for drive signals, i.e. the electrodes 61 and 71, wherein the electrode 61 applies an electric field to two optical waveguides 22 and 23 simultaneously while the electrode 71 applies an electric field to two optical waveguides 32 and 33 simultaneously. Thus, it is possible to realize the function equivalent to the dual-drive type due to anisotropy among four optical waveguides 22, 23, 32, 33. In this configuration, 4-value data signals applied to the electrodes 61 and 71 have four voltages, i.e. $V_0$, $V_1$, $-V_1$, $-V_0$, wherein the amplitude of each drive signal is set not to exceed two times the half-wavelength voltage, i.e. $2V_p$.

In the first, second, and third embodiments, Vbias1 and Vbias2 with differential polarities are applied to the optical modulators 2 and 3 while dither signals, superposed on bias voltages, with differential polarities are applied to the optical modulators 2 and 3; but the configuration of the present invention is not necessarily limited to the foregoing embodiment. To secure stable control of modulators, it is preferable to apply signals with differential polarities to modulators; however, with relatively simple formats of modulation signals, it is possible to simplify devices using single-phase signals.

The first, second, and third embodiments employ dither signals having sine waves or cosine waves, which can be replaced with square waves. At this time, high frequency components may occur in intensity modulation components of dither signals; hence, it is possible reconfigure the synchronous detection circuit 202 to detect high frequency components.

As described above, the digital circuit 300 of the second embodiment can be realized using a computer. In this case, programs achieving the foregoing functionality are stored in computer-readable storage media, and therefore programs stored in storage media are loaded into and executed by the computer system, thus implementing the foregoing functionality. Herein, the term "computer system" may embrace OS and hardware such as peripheral devices. The term "computer-readable storage media" refers to flexible disks, magneto-optical disks, ROM, portable media such as CD-ROM, and storage devices such as hard-disk units installed in computer systems. Additionally, the term "computer-readable storage media" may embrace any means of dynamically holding programs in a short period of time, e.g. networks like the Internet, and communication lines like telephone lines of transmitting programs, and other means of temporarily holding programs such as volatile memory devices installed in computer systems serving as servers or clients. The programs may achieve part of the foregoing functionality; the programs can be combined with other programs pre-installed in computer systems so as to achieve the foregoing functionality; or the programs can be realized using programmable logic devices such as FPGA (Field Programmable Gate Array).

Heretofore, the foregoing embodiments of the present invention have been described with reference to the drawings; however, concrete configurations are not necessarily limited to the foregoing embodiments; hence, the present invention may embrace any design without departing from the subject matter of the invention.

REFERENCE SIGNS LIST 6 drive amplifier
7 drive amplifier
8 bias power supply
9 bias power supply
10 bias power supply
11 optical tap
12 OE converter
51 electrode
61a, 61b electrodes
71a, 71b electrodes
81a, 81b electrodes
91a, 91b electrodes
85 differential amplifier
86 adder
95 differential amplifier
96 adder
100 IQ optical modulator
101 input optical waveguide
106 output optical waveguide
200 control circuit
202 synchronous detection circuit
210 bias control circuit
211 synthesizer
212 controller
500 light modulation device

The invention claimed is:

1. A light modulation device configured to carry out a quadrature amplitude modulation on a continuous-wave optical signal, comprising:
an I-component optical modulator configured to modulate one of continuous-wave optical signals being branched from the continuous-wave optical signal;
a Q-component optical modulator configured to modulate other of continuous-wave optical signals being branched from the continuous-wave optical signal;
an optical phase shifter configured to apply a phase shift to at least one of an output signal of the I-component optical modulator and an output signal of the Q-component optical modulator;
a first bias voltage output circuit configured to output a first bias voltage being set to a null point when no drive signal is applied to the I-component optical modulator;
a second bias voltage output circuit configured to output a second bias voltage being set to the null point when no drive signal is applied to the Q-component optical modulator;
a third bias voltage output circuit configured to output a third bias voltage used to adjust the phase shift caused by the optical phase shifter;
an optical power monitor configured to detect a power of a modulated optical signal modulated by each of the I-component optical modulator and the Q-component optical modulator;

a synchronous detection circuit configured to synchronously-detect a component of a frequency $f_d$ from the power of the modulated optical signal; and a control circuit configured to output a dither signal of a frequency $f_d/n$ applied to the first bias voltage or the second bias voltage when adjusting the first bias voltage or the second bias voltage while outputting two dither signals having a frequency $f_d/m$, which are mutually orthogonal to each other, applied to the first bias voltage and the second bias voltage when adjusting the third bias voltage, thus increasing or decreasing the bias voltages based on a synchronous detection result, where n is a positive integer equal to or larger than 1, m is a positive integer larger than 1 and n<m.

2. The light modulation device according to claim 1, wherein the control circuit configured to output a cosine signal of the frequency $f_d/n$ as the dither signal when adjusting the first bias voltage, to output a sine signal of the frequency $f_d/n$ as the dither signal when adjusting the second bias signal, and to output a cosine signal of the frequency $f_d/m$ as the dither signal for the first bias voltage while outputting a sine signal of the frequency $f_d/m$ as the dither signal for the second bias voltage when adjusting the third bias voltage, and wherein the synchronous detection circuit carries out synchronous detection using the cosine signal of $f_d/n$ as a reference clock signal when adjusting the first bias voltage, while the synchronous detection circuit carries out synchronous detection using the sine signal of the frequency $f_d/n$ as a reference clock signal when adjusting the second and third bias voltages.

3. The light modulation device according to claim 1, wherein n equal to 1 while m equals to 2.

4. The light modulation device according to claim 1, wherein the control circuit determines an order of a period of adjusting the first bias voltage, a period of adjusting the second bias voltage, and a period of adjusting the third bias voltage in advance, wherein the control circuit repeats sequentially outputting the dither signals for their periods and its corresponding reference clock signal to the synchronous detection circuit.

5. The light modulation device according to claim 4, wherein the first bias voltage output circuit increases or decreases the first bias voltage according to a first control signal supplied thereto, wherein the second bias voltage output circuit increases or decreases the second bias voltage according to a second control signal supplied thereto, and wherein the third bias voltage output circuit increases or decreases the third bias voltage according to a third control signal supplied thereto, the light modulation device further comprising:

a first dither signal applying circuit, connected to the first bias voltage output circuit and the control circuit, configured to apply the dither signal output from the control circuit to the first bias voltage, and a second dither signal applying circuit, connected to the second bias voltage output circuit and the control circuit, configured to apply the dither signal output from the control circuit to the second bias voltage, wherein the control circuit repeats sequentially outputting the first, second, and third control signals, each including information as to whether an appropriate bias is obtained or not, from the synchronous detection result, to the first, second, and third bias voltage output pacts circuits, during each period assigned to them, sequentially outputting the dither signals to the first and second dither signal applying circuits during each period assigned to them, while outputting the reference clock signals to the synchronous detection circuit during each period assigned to them.

6. The light modulation device according to claim 1, wherein the I-component optical modulator, the Q-component optical modulator, the optical phase shifter, and the optical power monitor are mounted on a same optical integrated circuit.

7. The light modulation device according to claim 1, wherein the control circuit and the synchronous detection circuit are formed using a digital circuit, thus causing the digital circuit to implement a means for outputting the dither signal of the frequency $f_d/n$ applied to the first bias voltage or the second bias voltage when adjusting the first bias voltage or the second bias voltage, a means for outputting the two dither signals having the frequency $f_d/m$, which are mutually orthogonal to each other, applied to the first and second bias voltages, a means for synchronously-detecting the component of the frequency $f_d$ from the power of the modulated optical signal, and a means for increasing or decreasing the bias voltages based on the synchronous detection result.

8. A light modulation method adapted to a light modulation device including an I-component optical modulator configured to modulate one of continuous-wave optical signals, branched from a continuous-wave optical signal, a Q-component optical modulator configured to modulate other of continuous-wave optical signals, branched from the continuous-wave optical signal, and an optical phase shifter configured to apply a phase shift to at least one of an output signal of the I-component optical modulator and an output signal of the Q-component optical modulator, the light modulation method comprising:

outputting a first bias voltage being set to a null point when no drive signal is applied to the I-component optical modulator;

outputting a second bias voltage being set to the null point when no drive signal is applied to the Q-component optical modulator;

outputting a third bias voltage used to adjust the phase shift caused by the optical phase shifter;

detecting a power of a modulated optical signal modulated by each of the I-component optical modulator and the Q-component optical modulator;

carrying out a synchronous detection on a component of a frequency $f_d$ from the power of the modulated optical signal; and outputting a dither signal of a frequency $f_d/n$ applied to the first bias voltage or the second bias voltage when adjusting the first bias voltage or the second bias voltage;

outputting two dither signals having a frequency $f_d/m$, which are mutually orthogonal to each other, applied to the first bias voltage and the second bias voltage when adjusting the third bias voltage; and increasing or decreasing the bias voltages based on a synchronous detection result, where n is a positive integer equal to or larger than 1, m is a positive integer larger than 1, and n<m.

9. The light modulation method according to claim 8, wherein a cosine signal of the frequency $f_d/n$ is output as the dither signal when adjusting the first bias voltage, a sine signal of the frequency $f_d/n$ is output as the dither signal when adjusting the second bias signal, and a cosine signal of the frequency $f_d/m$ is output as the dither signal for the first bias voltage while outputting a sine signal of the frequency $f_d/m$ as the dither signal for the second bias voltage when adjusting the third bias voltage, and wherein the synchronous detection is carried out using the cosine signal of $f_d/n$ as a reference clock signal when adjusting the first bias voltage, while the synchronous detection is carried out using the sine signal of the frequency $f_d/n$ as a reference clock signal when adjusting the second and third bias voltages.

10. The light modulation method according to claim 8, wherein n equal to 1 while m equals to 2.

11. The light modulation device according to claim 8, further comprising:

determining an order of a period of adjusting the first bias voltage, a period of adjusting the second bias voltage, and a period of adjusting the third bias voltage in advance; and repeating sequentially outputting the dither signals for their periods and its corresponding reference clock signal for use in the synchronous detection.

12. The light modulation method according to claim 11, further comprising:

increasing or decreasing the first bias voltage according to a first control signal supplied thereto;

increasing or decreasing the second bias voltage according to a second control signal supplied thereto; and increasing or decreasing the third bias voltage according to a third control signal supplied thereto, wherein each of the first, second, and third control signals includes information as to whether or not an appropriate bias is obtained from the synchronous detection result.

* * * * *